(12) United States Patent
Gunyakti et al.

(10) Patent No.: US 7,331,063 B2
(45) Date of Patent: Feb. 12, 2008

(54) METHOD AND SYSTEM FOR LIMITING SOFTWARE UPDATES

(75) Inventors: Caglar Gunyakti, Sammamish, WA (US); Kristjan Eric Hatlelid, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 602 days.

(21) Appl. No.: 10/836,409

(22) Filed: Apr. 30, 2004

(65) Prior Publication Data

US 2005/0246537 A1    Nov. 3, 2005

(51) Int. Cl.
G06F 21/22 (2006.01)
G06F 9/22 (2006.01)
H04L 9/32 (2006.01)

(52) U.S. Cl. .................. 726/30; 713/176; 705/57; 717/171

(58) Field of Classification Search .............. None
See application file for complete search history.

(56) References Cited

U.S. PATENT DOCUMENTS

| | | | | |
|---|---|---|---|---|
| 6,026,293 A * | 2/2000 | Osborn | ............... | 455/411 |
| 6,131,088 A * | 10/2000 | Hill | ............... | 705/27 |
| 6,189,146 B1 | 2/2001 | Misra et al. | ............... | 717/11 |
| 6,226,747 B1 | 5/2001 | Larsson et al. | ............... | 713/200 |
| 6,243,468 B1 | 6/2001 | Pearce et al. | ............... | 380/255 |
| 6,857,067 B2 * | 2/2005 | Edelman | ............... | 713/155 |
| 6,986,133 B2 * | 1/2006 | O'Brien et al. | ............... | 717/173 |
| 7,003,110 B1 * | 2/2006 | Jakobsson et al. | ............... | 380/45 |
| 7,159,240 B2 * | 1/2007 | England et al. | ............... | 726/6 |
| 7,225,333 B2 * | 5/2007 | Peinado et al. | ............... | 713/164 |
| 2001/0034712 A1 | 10/2001 | Colvin | ............... | 705/52 |
| 2001/0044782 A1 | 11/2001 | Hughes et al. | ............... | 705/59 |
| 2003/0188160 A1 * | 10/2003 | Sunder et al. | ............... | 713/165 |
| 2007/0067419 A1 * | 3/2007 | Bennett | ............... | 709/219 |
| 2007/0077996 A1 * | 4/2007 | Chiu et al. | ............... | 463/42 |
| 2007/0101416 A1 * | 5/2007 | Kim | ............... | 726/5 |
| 2007/0124305 A1 * | 5/2007 | Smith et al. | ............... | 707/10 |

FOREIGN PATENT DOCUMENTS

WO   WO 99/56196   * 11/1999

OTHER PUBLICATIONS

Arenas, M. et al., "Answer Sets for Consistent Query Answering in Inconsistent Databases," *Theory and Practice of Logic Programming*, 2003, 3(4-5), 393-424.

(Continued)

*Primary Examiner*—Christopher Revak
(74) *Attorney, Agent, or Firm*—Woodcock Washburn LLP

(57) ABSTRACT

A method of detecting pirated software includes receiving a request for a software update by a client computer and providing to the client computer a test to be performed. The test is performed on the client computer against the client software application. The client computer may be denied a software update as a result of the test finding an illegitimate copy of the client software. The invention may be practiced in a network environment where a server transfers a test program for a client to execute upon request of a software update. The test performs an integrity check and denies the request for a software update if the client software is found to be illegitimate.

8 Claims, 3 Drawing Sheets

OTHER PUBLICATIONS

Gelard, P. et al., "Atlas—An ATM Demonstration Experiment for High-Rate Space Telemetry Transportation," *Computer Networks and ISDN Systems*, 1994, 25(S3), S99-S103.

Kang, W.J. et al., "Dynamic License Control System for an On-line Circulation of Digital Product in Electronic Commerce", *Proceedings of the IASTED International Conference, Internet and Multimedia Systems and Applications*, 2000, 140-144.

Musich, P. "MSPs Make Big Deals—As Customers' Needs Change, Small Companies License Software, Team with Larger Vendors", *EWEEK*, 2002, 19(26) (Jul1) 23.

Schulz, N. "E-Journal Databases: A Long-Term Solution?", *Library Collections Acquisitions & Technical Services*, 2001, 25(4), 449-459.

Aura, T. et al., "Software License Management with Smart Cards", *Proceedings of the USENIX Workshop on Smartcard Technology*, 1999, 75-85.

Grantham, I., "Centralize Software Monitoring with LicenseTrack 3.4", *UNIX Review*, 1996, 14(7), 45-46, 48.

Yang, J. et al., "Fast Secure Processor for Inhibiting Software Piracy and Tampering", *Proceedings of the 36$^{th}$ International Symposium on Microarchitecture IEEE Computer Society*, 2003, 351-360.

Zhang, X. et al., "Hiding Program Slices for Software Security", *ACM International Conference Proceeding Series, Proceedings of the International Symposium on Code Generation and Optimization: Feedback-Directed and Runtime Optimization, IEEE Computer Society*, 2003, 325-336.

* cited by examiner

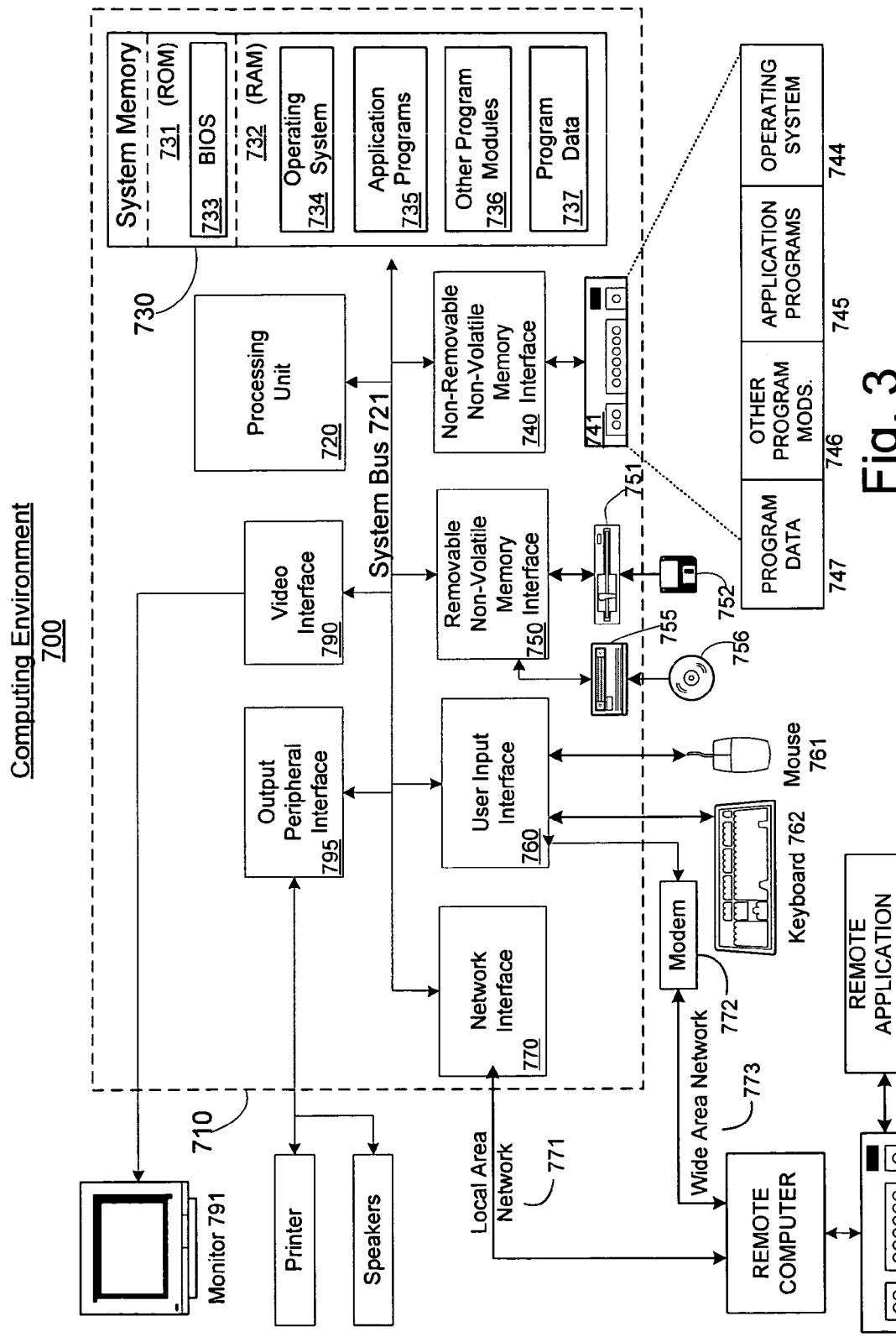

US 7,331,063 B2

METHOD AND SYSTEM FOR LIMITING SOFTWARE UPDATES

FIELD OF THE INVENTION

This invention relates in general to the field of computer software security. More particularly, this invention relates to detection of pirated or unlicensed software.

BACKGROUND OF THE INVENTION

Software piracy is a major concern of software producers. Huge monetary revenue losses are attributed to the illegal copying and use of marketed software products. Protection for Software products can take many forms. One popular form is the use of embedded code within the software product that generally makes it difficult to operate code that has been illegally copied. Although these type of software based code protections are useful to inhibit the unskilled software thief, well trained software hackers are merely slowed down by such protections. Indeed, there are several commercially available tools available on the Internet that can assist software hackers to reverse engineer code so that patches or other work-arounds may be devised to overcome the software based protections. Therefore, the currently available software based code protections are becoming less and less effective in preventing unauthorized use of commercially available software. However, software based code protections do work to some level to protect against piracy and are effective against some would-be software pirates.

Thus, there is a need for a technique for protecting software from thieves that leverages off of the software code protection concept, but also answers the problem of the intelligent thief who would reverse engineer the code and inhibit those protections. The present invention addresses the aforementioned needs and solves them with additional advantages as expressed herein.

SUMMARY OF THE INVENTION

A method of detecting pirated software includes receiving a request for a software update by a client computer and providing to the client computer a test to be performed. The test is performed on the client computer against the client software application. As a result of the test, the client computer may be denied a software update thus stopping the propagation of theft of software.

According to one aspect of the invention, a client requests a software update from a server which transmits the test code to the client, the client executes the code and sends the results to the server. The server evaluates the results and either grants the request for a software update or denies it based on the server verifying, via the test, that the client software is legitimate. In a non-server environment, a test may be delivered to a client computer requesting an upgrade from a CD. The grant or denial of the upgrade request is based on the success of failure, respectively, of the integrity test performed by the client computer on the software application.

BRIEF DESCRIPTION OF THE DRAWINGS

The foregoing summary, as well as the following detailed description of preferred embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings:

FIG. 3 is a block diagram showing an exemplary computing environment in which aspects of the invention may be implemented.

DETAILED DESCRIPTION OF ILLUSTRATIVE EMBODIMENTS

Overview

Figure 1:
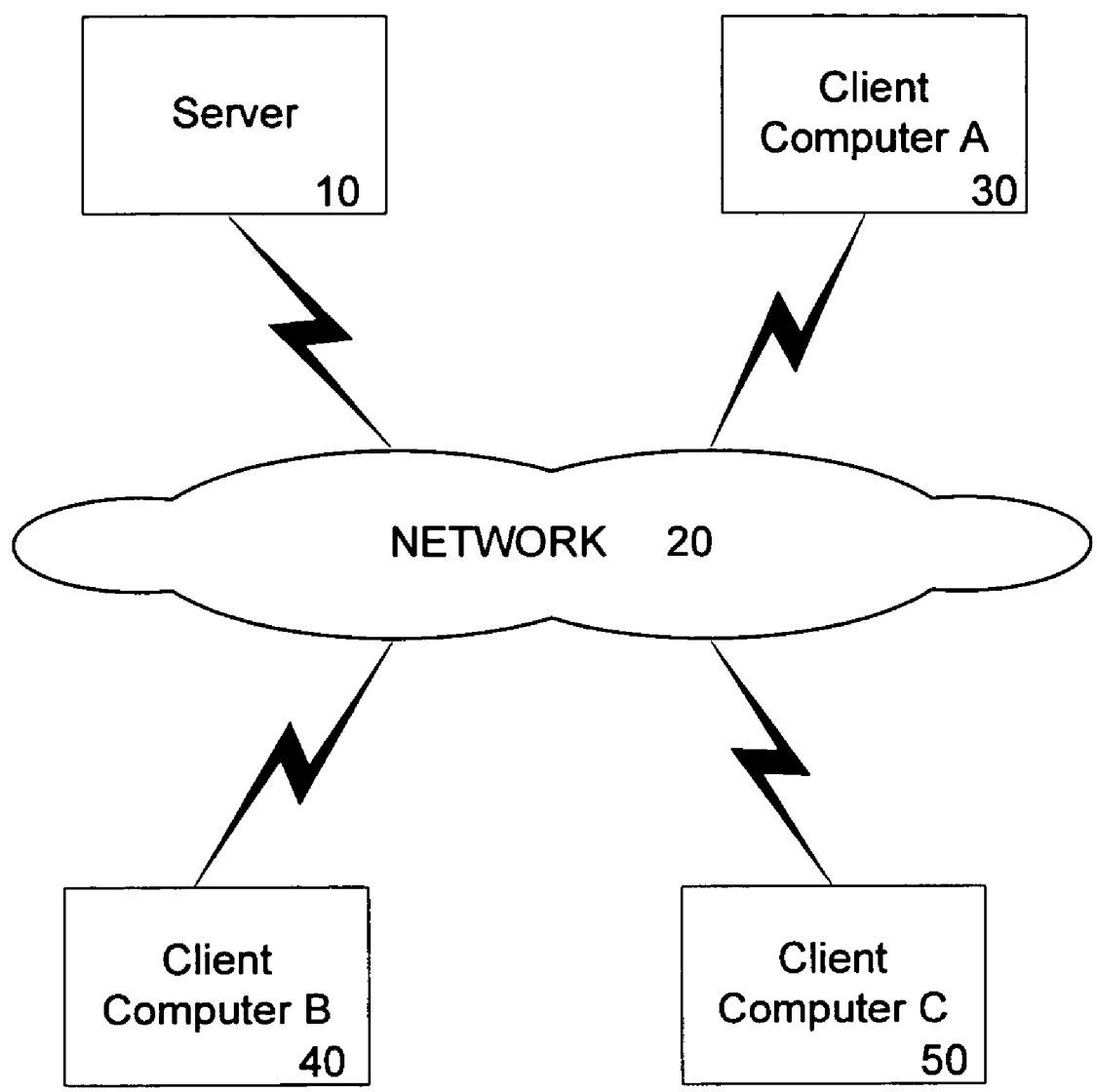
FIG. 1 is a block diagram of a network in which an embodiment of the invention may be practiced.

Software based anti-piracy techniques may be used to advantage by using the anti-piracy code added to an application to help identify if the copy of software being used is a legitimate licensed copy. A thief of software may alter the software-based protections and disable them so as to trick the protection schemes into allowing use of the application.

It is an aspect of the present invention that a denial of a legitimate update to such a pirated application may occur if a test is performed upon the suspected code at the site of the application such that results are returned which indicate the suspected code's integrity. By testing the proper presence and/or functionality of the such items as software based anti-piracy protections, an assessment may be made as to the authenticity of a viable license. If the test performed by the client computer which hosts the suspected application fails, then the code may have been altered and is most likely not properly licensed. Under these conditions, an update of the software can be denied, thus preventing the continuation of upgrades use of pirated code. Preventing future upgrades will eventually render the pirated copy of the software outdated and the usefulness of the stolen copy of software is therefore reduced.

Exemplary Embodiments of the Invention

There are three dominant categories of attacks against software-based protections placed in software applications that are sold to consumers. The first category is may be termed data attacks where the software protection mechanism is thwarted by changing data relied upon to sense an out-of-limit condition. For example, if a software application which is installed on a users machine, say a trial copy, is useful for a one week or one month period, the software protection mechanism prevents access of the application after the one week or one month expiration date. One way of thwarting this protection is to enter the software protection code and remove or otherwise tamper with the timer information (data) such that the timeout period is never reached. Thus the thief has taken the time-limited license of the trial application software and has illegally extended the period of license to be indefinite. Another common technique is to reset the trial software timer to zero with every boot of the trial software, thus illegally extending the temporary license period. These kinds of attacks may be termed data attacks.

A second category of attack against software-based anti-theft mechanisms may be termed a binary patch. This common technique involves the software thief generating code to work in the pirated application to continue to function because a code patch thwarts a license test parameter. For example, if a licensed copy of software is to terminate at a given time, or if some other test of license viability is used, a software patch may be used by a thief to set the state of the test to be always licensed even though the license may have expired. This type of attack may be termed a binary attack.

A third type of attack against software-based anti-theft protections may be called bypass key leakage. In this type of attack, a multi-user key, usually given to businesses as a site-license for a software application, may be modified to allow unauthorized key holder to gain a copy of the desired application software. An example would be the sale of other propagation of the bypass license key to persons outside of the business which legitimately purchased the key. The compromised key, and a product identifier, if given to others, can be used to gain a working copy of desired software.

In general, if a bypass key leakage type of attack is discovered, the bypass key may be changed and the old key may be used to deny upgrades to the pirated software. This type of attack resolution is currently known in the art. However, data type attacks and binary type attacks are less easy to detect and overcome.

Data and binary type attacks may be detected by running tests against the source code of the stolen application. If the tests reveal that the source code is the same code originally distributed by the manufacturer, then the application program under test may be considered viable. However, if the application code is different than that distributed by the manufacturer, then the code may have been altered. The alteration of code could be legitimate or the alterations could be an indication of tampering which may indicate pirated code.

Application software code that does not match with the manufacturers original product may be a result of the normal process of acquiring legitimate updates from the manufacturer. Those updates are generally reflected in the application as either a new version or as a service pack update which is applied to the application. Thus, different tests of a software application code may be necessary depending on the version or software service pack that is indicated on the application. Tests such as a cyclical redundancy code check, a check sum or hash values have to be applied according the application software maturity level.

Another type of test that may be performed to determine the integrity of the application software may be the execution of hidden code in the software application. Code hidden in the application software may be dormant in terms of application usefulness, but may be activated if an integrity test is desired. Another software-based anti-theft measure may be the insertion of various digital signatures in the application software. Failure of a digital signature may be an indication of an application code that may have been modified to extend licensure for a thief. In one aspect of the invention, tests on application software to determine its license integrity may be performed on-line.

FIG. 1 depicts a network configuration 100 wherein aspects of the invention may be practiced. In this configuration, a network 20, interconnects clients computers A, B and C (30, 40 and 50 respectively) to a network server 10. Although only one server is shown and only three clients, the configuration of FIG. 1 is only exemplary and a greater number of servers is possible as is a lesser or greater number of client computers. In the network configuration, the server 10 may be designated as a server that can provide software updates to client computers 30, 40 and 50 when requested.

In a preferred embodiment, a client computer, 30, 40 or 50, preferably contacts the server 10 to request an upgrade of a software application resident on the client computer. The server 10 is capable of providing the requested upgrade. In an aspect of the invention, the server 10 is also capable of providing a client software application integrity test code which can be transferred to the client machine and executed there. The client 30, 40 and 50 may then send the test results back to the server 10 for evaluation. The results of the evaluation may determine whether the client is allowed access to the software application upgrade or whether the upgrade request is denied based upon the possibility that the client is running pirated software.

Figure 2:
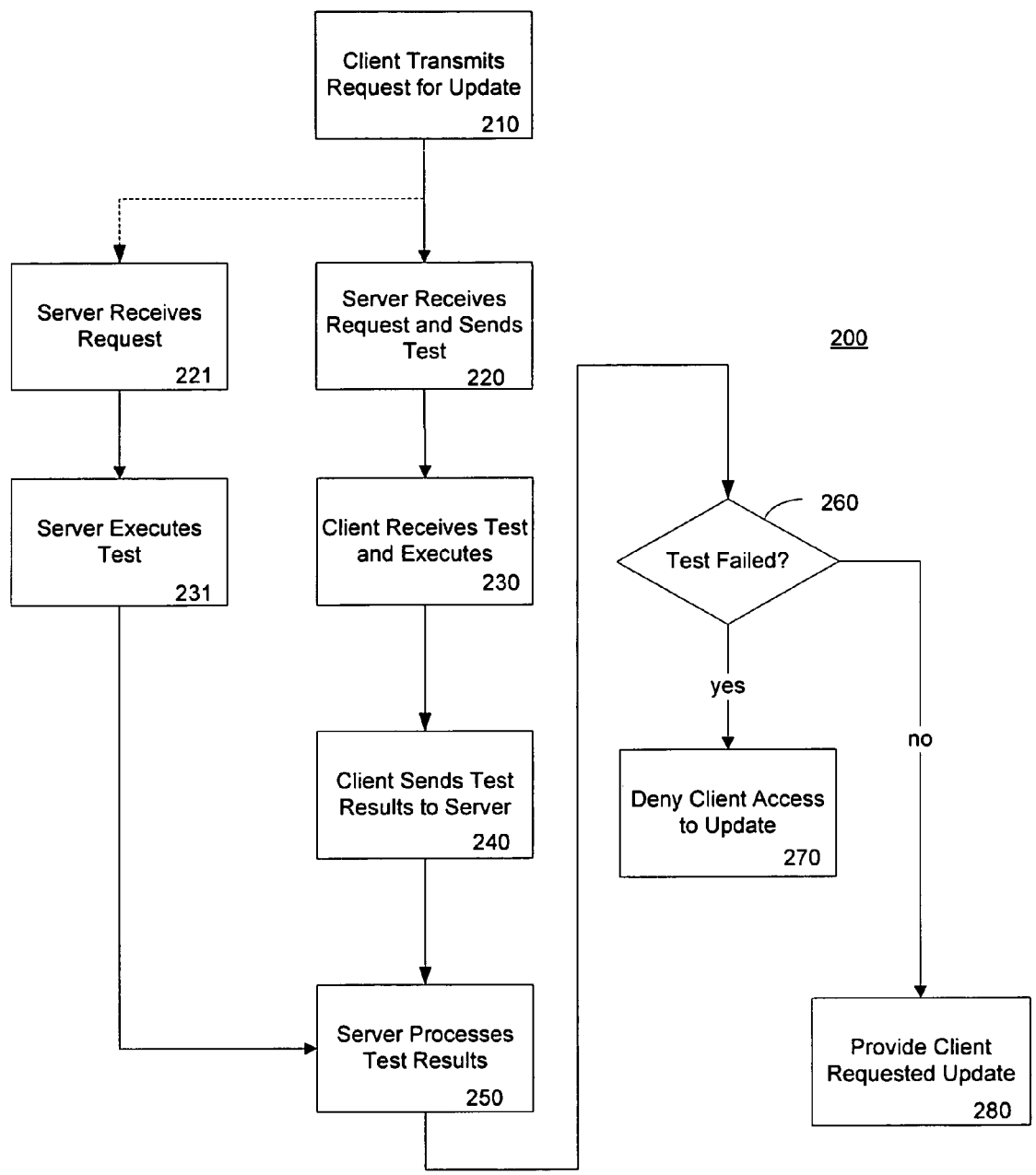
FIG. 2 is a flow diagram of a method involving aspects of the invention.

FIG. 2 is an exemplary method incorporating aspects of the invention. In a system which includes at least one client and one server, the method may be initiated by a client computer generating and sending a request for an update for a client software application (step 210). The server receives the request for the software update and responds by sending a test to the client computer (step 220). As discussed herein, the test is one that is designed to detect if the client software application, which is a subject of the requested update, is a legitimate copy. The test sent to the client computer is tailored according to the specific software update requested along with information concerning the version or service pack upgrades available on the client computer. Thus, in one embodiment of the invention, after receipt of a request for a software upgrade a series of queries between the server and the client may be made to allow the server to more fully ascertain the scope of the upgrade and identify the software product and version available on the client computer.

Once the server determines which type and version of software application update is requested, the server sends the corresponding test code to the client computer (step 220). The test code is received by the client computer and then may be executed (step 230). The executed test code examines the client software application and tests it for general integrity. The test may be designed to exercise portions of the client software to determine if the code has been tampered with or determines if the code is otherwise out of license. Altered code may be an indication of piracy as is the possibility of altered data that concerns the licensing of the code (such as timer information) which may also indicate illegitimate use.

The executable test is executed in the client computer so that it may access all aspects of the client software code in an attempt to discover if the subject software application is within tolerance for an update. It is an aspect of the invention that the test code be provided via a source outside of the client computer, such as by a server, such that the any client-based code is unable to predict the type of test to be run to verify the integrity of the client software application. The result is that a software thief who has modified a client software application may well be unable to mask all of his actions in overcoming the license limitations of the software application. After the executable test is run on the client computer, the results of the integrity test are provided to the server (step 240). The server may then begin to process the test results (step 250).

As an alternate embodiment, the client may transmit a request for an update (step 210) and a server may receive the request (step 221, via dotted line). The server may determine the most appropriate test to verify the integrity of the client software. As above, after the request for upgrade is made to the server, a series of queries between the server and the client may be made to allow the server to more fully ascertain the scope of the upgrade and identify the software product and version available on the client computer. When the proper integrity test is determined by the server, then the server may itself execute the integrity test (step 231).

Using either the path through step 231 or through step 240, the processing of the test results (step 250) may be either extensive or relatively straightforward. Extensive processing may be to process CRC, sumchecks, hash values, digital signatures, hidden executables or other methods of test and compare them against standards and tolerances to determine of a test failed or passed. If is also possible that the test performed against the client application software yields a failed or passed status and the status and or data is passed back to the server. In either event, the processed results may be tested for success or failure at step 260.

If the results indicate that the test did not fail and the client software application is deemed legitimate as a result, then the server is authorized to provide the requested client software update (step 280). If the test did fail, then the software integrity has most likely been compromised and the requested software application update is denied (step 270).

In one embodiment, the test that is provided to the client by the server to test the integrity of the client software application may include sending time zero information along with encrypted product identification (PID) or product key (Pkey) combination PID/Pkey to a server, such as a Windows® update server, available from Microsoft® Corporation of Redmond, Wash. If the server gets a different time zero for the same PID/Pkey combination for more than N times, such as when N<100, then it may be concluded that more than one machine is using the same PID/Pkey. Under these circumstances, the client software application may be considered to be operating out of license and software updates may be denied as described above.

In another embodiment, a software-based license enforcement may be built into the client software application. Corresponding application programming interfaces (APIs) may be implemented in different binary files that ship with the client software application. The test program sent to the client may be executed on the client computer and the test program may call the APIs to get information about the specific client software application and send that information to the server. The same test program may also calculate hashes of binary selected binary files and send them to the update servers. These hash values are then compared with valid binary hash values in a table on server side. If the hash values do not match, then binary file has a high probability of being patched or altered in some way unintended by the software manufacturer. In this embodiment, there may be a mechanism internal or external to the update server that updates entries in the hash table whenever a qualified software upgrade or service pack update is released by the software manufacturer.

In another embodiment, hash or actual values of active license files, such as XrML license files, may be sent to the update server. Since the active license files or XrML licenses are less likely to change, fewer updates of updated has values of binary files may be sent the update server.

In another embodiment, a self-auditing mechanism within the client software application itself which can generate a heart-beat sequence may be probed by the update server if an update is requested. The update server can detect or test for this heart-beat sequence and the sequence may be validated by the update server. Based on the validation, the requested update may be provided or denied as described above.

In another embodiment, an actual bypass license key may be securely sent to the update server, the integrity test may then comprise comparing the genuine key with the bypass license key present on the client computer. In this manner, an update server may test the license key and identify client computers that are using fake bypass license keys. Additionally, non-genuine product keys may be detected and differentiated from authentic product keys to identify pirate client software.

In a non-networked embodiment of the present invention, server side authentication mechanisms as described above that may be used as client executed tests in the present invention and can also be integrated in a signed binary file. This binary file can be integrated with an offline software package installer that ships on CD. In this embodiment, the client would purchase a CD having updates to software. This installer on the CD may call an authentication mechanism to verify client software already installed on the client machine before upgrading and/or applying new updates. If the CD provided test mechanism detects that the client computer has a compromised integrity application, the update of that application would be denied. If the test mechanism detected that the client software application is a legitimate copy, then the update to the application would be provided.

Exemplary Computing Device

FIG. 3 and the following discussion are intended to provide a brief general description of a suitable computing environment in which embodiments of the invention may be implemented. While a general purpose computer is described below, this is but one example, and embodiments of the invention may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 3 thus illustrates an example of a suitable computing system environment 700 in which the embodiments of the invention may be implemented, although as made clear above, the computing system environment 700 is only one example of a suitable computing environment and is not intended to suggest any limitation as to the scope of use or functionality of an embodiment of the invention. Neither should the computing environment 700 be interpreted as having any dependency or requirement relating to any one or combination of components illustrated in the exemplary operating environment 700.

With reference to FIG. 3, an exemplary system for implementing an embodiment of the invention includes a general purpose computing device in the form of a computer system 710. Components of computer system 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 710 typically includes a variety of computer readable media. Computer readable media can be any available media that can be accessed by computer system 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer system 710, such as during start-up, is typically stored in ROM 731. RAM 732 typically contains data and/or program modules that are immediately accessible to and/or presently being operated on by processing unit 720. By way of example, and not limitation, FIG. 3 illustrates operating system 734, application programs 735, other program modules 736, and program data 737.

The computer system 710 may also include other removable/non-removable, volatile/nonvolatile computer storage media. By way of example only, FIG. 3 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 3 provide storage of computer readable instructions, data structures, program modules and other data for the computer system 710. In FIG. 3, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer system 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB). A monitor 791 or other type of display device is also connected to the system bus 721 via an interface, such as a video interface 790, which may in turn communicate with video memory (not shown). In addition to monitor 791, computer systems may also include other peripheral output devices such as speakers 797 and printer 796, which may be connected through an output peripheral interface 795.

The computer system 710 may operate in a networked or distributed environment using logical connections to one or more remote computers, such as a remote computer 780. The remote computer 780 may be a personal computer, a server, a router, a network PC, a peer device or other common network node, and typically includes many or all of the elements described above relative to the computer system 710, although only a memory storage device 781 has been illustrated in FIG. 3. The logical connections depicted in FIG. 3 include a local area network (LAN) 771 and a wide area network (WAN) 773, but may also include other networks/buses. Such networking environments are commonplace in homes, offices, enterprise-wide computer networks, intranets and the Internet.

When used in a LAN networking environment, the computer system 710 is connected to the LAN 771 through a network interface or adapter 770. When used in a WAN networking environment, the computer system 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer system 710, or portions thereof, may be stored in the remote memory storage device. By way of example, and not limitation, FIG. 3 illustrates remote application programs 785 as residing on memory device 781. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API), or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a technique for the detection of illegitimate software. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of detecting pirated software at a server, the method comprising:

receiving a request, from a client computer, for a software update to a software product resident on a client computer;

determining, at the server, a test to be performed against the software product in the client computer, the test comprising executable code;

sending the test to the client computer;

executing the code of the test at the client computer;

sending results of the test to the server for evaluation, the results of the test used by the server to determine if the software product in the client computer is a legitimate copy; and denying the client computer the software update if the client computer fails the test as evaluated by the server computer, wherein the test detects pirated software.

2. The method of claim 1, wherein receiving a request for a software update comprises the server receiving the software update request over a network wherein the server hosts piracy detection software.

3. The method of claim 1, wherein the step of performing the test at the client computer comprises performing a runtime integrity check of a client software program.

4. The method of claim 3, wherein the runtime integrity test comprises one or more of running an executable present in client software, performing a cyclical redundancy code test, performing a hash value test and verifying a digital signature.

5. A computer-readable storage medium having computer-executable instructions for performing a method on a server computer, the method comprising:

receiving a request from a client computer for a software product update;

determining a test to be performed against the software product in the client computer, the test comprising executable test code;

downloading the test code from the server computer to the client computer, the text code executing in the client computer;

receiving results of the test performed by the client computer, the results of the test used by the server computer to determine if the software product in the client computer is a legitimate copy;

determining whether the client computer software product has been altered by evaluating the test results; and determining whether to permit the software update dependent on the evaluation of the test results.

6. The computer-readable storage medium of claim 5, the method further comprising denying the software update if the results of the test indicate that the software product has been altered.

7. A system for detecting pirated software, the system comprising:

a network for transmitting messages between a server and a client;

a server computer having software updates for client computers, wherein the server resides on the network;

a client computer residing on the network, wherein the client computer requests an update of client software from the server; and wherein a test is performed by the client computer against the client software, wherein the test comprises executable software product test code that is executable on the client computer; wherein test results from execution of the software product test code are sent to the server computer for a determination of whether the client software is pirated, and wherein the client computer is denied the update of client software if the test results fail to pass in the server computer.

8. The system of claim 7, wherein the test downloaded from the server into the client computer is designed to perform a runtime integrity check of a client software program.

* * * * *